United States Patent [19]

Sato et al.

[11] Patent Number: 5,099,231
[45] Date of Patent: Mar. 24, 1992

[54] IMAGE OUTPUT SYSTEM FOR OUTPUTTING MULTI-LEVEL INFORMATION STORED AS TRANSITION POINTS

[75] Inventors: Kei Sato, Atsugi; Noboru Murayama, Machida, both of Japan

[73] Assignee: Ricoh Company, Ltd., Japan

[21] Appl. No.: 537,598

[22] Filed: Jun. 14, 1990

[30] Foreign Application Priority Data

Jun. 20, 1989 [JP] Japan ................................ 1-157269

[51] Int. Cl.$^5$ .............................................. G09G 1/14
[52] U.S. Cl. ..................................... 340/747; 340/729; 382/22
[58] Field of Search .......................... 358/426; 382/22; 340/747, 744, 729; 364/518, 521

[56] References Cited

U.S. PATENT DOCUMENTS

| | | | |
|---|---|---|---|
| 4,068,224 | 1/1978 | Bechtle et al. | 340/324 AD |
| 4,847,607 | 7/1989 | Schoon | 340/730 |
| 4,857,904 | 8/1989 | Schoon | 340/730 |
| 4,967,376 | 10/1990 | Katsura | 364/521 |

FOREIGN PATENT DOCUMENTS 53-41017 10/1978 Japan .

*Primary Examiner*—Leo H. Boudreau
*Assistant Examiner*—Andrew W. Johns
*Attorney, Agent, or Firm*—Mason, Fenwick & Lawrence

[57] ABSTRACT

An image output system includes a memory for storing multi-level information which describes each pixel of a binary image when the binary image is scanned in a main scanning direction, where the multi-level information has a first value at a black transition point where a pixel changes from white to black and has a second value at a white transition point where a pixel changes from black to white, a counter for keeping a count, a decoder for decoding the multi-level information read out from the memory, where the decoder outputs a value indicating black when the count of the counter is greater than or equal to one, and a controller for controlling an operation timing of the decoder in synchronism with reading of the multi-level information from the memory. The controller scans the memory to read the multi-level information from the memory and supplies the read multi-level information to the decoder. The decoder increments the count of the counter by one when the multi-level information has the first value and decrements the count of the counter by one when the multi-level information has the second value.

6 Claims, 4 Drawing Sheets

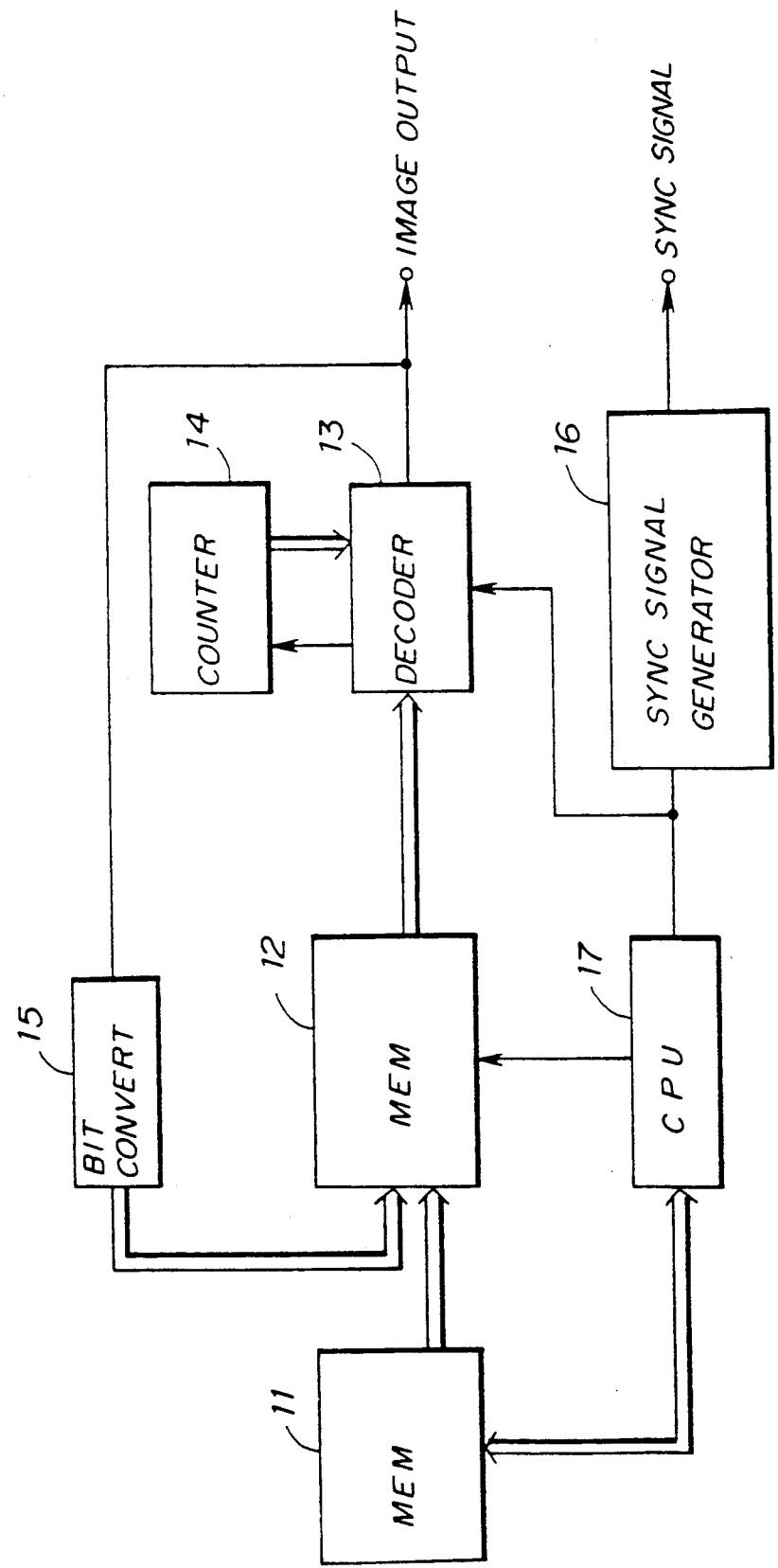

IMAGE OUTPUT SYSTEM FOR OUTPUTTING MULTI-LEVEL INFORMATION STORED AS TRANSITION POINTS

BACKGROUND OF THE INVENTION

The present invention generally relates to image output systems, and more particularly to an image output system which is suited for an outline font which describes a contour line by a mathematical formula.

Because the outline font describes a contour line by a mathematical formula, it is possible to carry out a process such as enlargement, reduction and rotation. For this reason, the outline font is now often used in place of the conventional dot font. However, the biggest problem of the outline font is that the processing speed is slow. More than half of the total processing time is spent on filling or painting the inside of the contour line.

A Japanese Published Patent Application No. 53-41017 proposes a method of increasing the painting speed. According to this proposed method, a contour line of a pattern which is displayed in dots is once written into a memory. The contour line written in the memory is successively scanned in a main scanning direction, and an interval between one black point to a next black point is filled by black for each scanning line. But according to this method, an erroneous operation occurs when the pattern includes a portion having a width of one dot. In addition, there is a problem in that the processing speed is dependent on a speed with which the contour line is written into the memory because the contour line of the pattern is once written into the memory.

An image output system is proposed in a U.S. patent application Ser. No. 489,094 filed Mar. 6, 1990 in which the assignee is the same as that of this application to prevent the above described erroneous operation and to considerably increase the processing speed. According to this image output system, coordinates of a starting point (black transition point) of a black line and a starting point (white transition point) of a white line in each scanning line are obtained and stored in an image memory. Then, the image memory is successively scanned to fill an interval between the starting point of the black line to the starting point of the white line. In other words, the starting points of the black and white lines are written as data "1" in the image memory for each scanning line. A reproduced pattern is obtained by successively scanning the image memory and setting "1" (black) from the odd numbered data "1" to the even numbered data "1" and resetting "0" (white) for the even numbered data "1" with respect to each scanning line.

According to this proposed image output system, a pair made up of a black starting point and a white starting point always exists on one scanning line even when the width of the black line corresponds to one dot, and for this reason, the pattern will not be reproduced erroneously. In addition, since the starting points of black and white lines are written into the image memory and not the contour line itself, the number of points to be written is effectively reduced thereby improving the processing speed. Normally, this proposed image output system introduces no problems. However, it was found that the following problems occur in particular combinations of patterns.

First, when a pattern such as a line graphic which requires no painting and a pattern which requires painting coexist in the image memory, it is impossible to distinguish the two patterns.

Second, when transition point information which require painting intersect in the image memory, it is impossible to distinguish the start and end of the painting.

SUMMARY OF THE INVENTION

Accordingly, it is a general object of the present invention to provide a novel and useful image output system in which the problems described above are eliminated.

Another and more specific object of the present invention is to provide an image output system comprising memory means for storing multi-level information which describes each pixel of a binary image when the binary image is scanned in a main scanning direction, where the multi-level information has a first value at a black transition point where a pixel changes from white to black and has a second value at a white transition point where a pixel changes from black to white, counter means for keeping a count, decoder means coupled to the memory means and the counter means for decoding the multi-level information read out from the memory means, where the decoder means outputs a value indicating black when the count of the counter means is greater than or equal to one, and control means coupled to the memory means and the decoder means for controlling an operation timing of the decoder in synchronism with reading of the multi-level information from the memory means. The control means scans the memory means to read the multi-level information from the memory means and supplies the read multi-level information to the decoder means. The decoder means increments the count of the counter means by one when the multi-level information has the first value and decrements the count of the counter means by one when the multi-level information has the second value. According to the image output system of the present invention, the graphic data of black and white transition points which are written based on the contour information and the graphic data which are written with the actual image may coexist within the memory means. In addition, the graphic data made up of the black and white transition points may intersect within the memory means. As a result, the graphic data with the actual image can be output as it is, and the graphic data made up of the black and white transition points can be painted as required.

Other objects and further features of the present invention will be apparent from the following detailed description when read in conjunction with the accompanying drawings.

BRIEF DESCRIPTION OF THE DRAWINGS

FIG. 1 is a system block diagram showing an embodiment of an image output system according to the present invention;

DESCRIPTION OF THE PREFERRED EMBODIMENTS

Figure 2A:
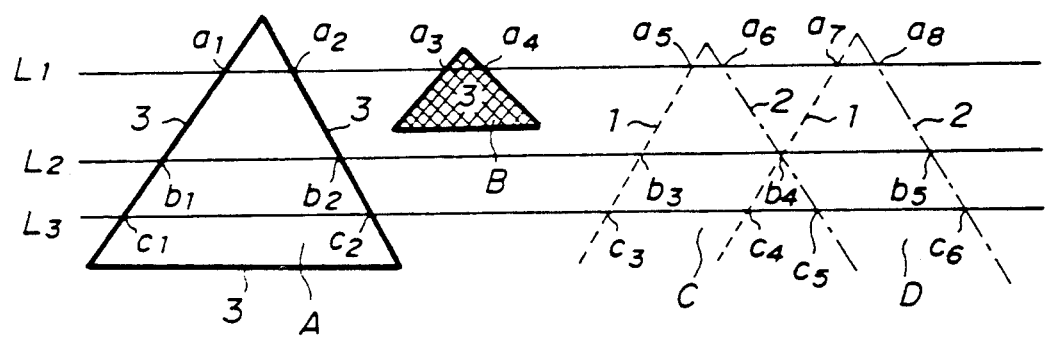
FIGS. 2A and 2B are diagrams for explaining a processing carried out on the system shown in FIG. 1.

FIG. 1 shows an embodiment of an image output system according to the present invention. The image output system shown in FIG. 1 includes a contour information memory 11, an image memory 12, a decoder 13, a paint instruction counter 14, a bit converter 15, a synchronizing signal generator 16 and a central processing unit (CPU) 17 which are connected as shown.

For the sake of convenience, it is assumed that the image memory 12 stores a 2-bit data for each pixel. The 2-bit data may take any of values "0" (00), "1" (01), "2" (10) and "3" (11). A pixel which corresponds to a black transition point is indicated by the value "1", and a pixel which corresponds to a white transition point is indicated by the value "2". A black pixel which does not need to be painted and is simply output in black as it is indicated by the value "3". Other pixels are indicated by the value "0". All of the contents of the image memory 12 are initially cleared to "0".

The contour information memory 11 stores the contour information (contour vector font data) of the image which is to be output. The CPU 17 carries out various processing and control operations. The CPU 17 reads the contour information from the contour information memory 11 and obtains the black transition point and the white transition point in the main scanning direction. The CPU 17 stores in the image memory 12 the value "1" for the black transition point and the value "2" for the white transition point. On the other hand, an image such as a line graphic is made up of black pixels which require no painting, and the CPU 17 stores the value "3" for such black pixels. Furthermore, the image memory 12 is also used for storing pixels which are filled with black (that is, painted) as will be described later. The CPU 17 also stores the value "3" for such pixels which are painted. All other regions of the image memory 12 maintain the value "0".

The black transition point (or black change dot) refers to a point (or dot) where the pixel changes from white to black when scanning the contour of the image in a scanning direction. Similarly, the white transition point (or white change dot) refers to a point (or dot) where the pixel changes from black to white when scanning the contour of the image in the scanning direction.

The method of obtaining the black and white transition points is further disclosed in a U.S. patent application Ser. No. 489,094 filed Mar. 6, 1990, the disclosure of which is hereby incorporated by reference.

When outputting the image, the CPU 17 successively scans the image memory 12 in the main scanning direction, and the values read out from the image memory 12 are supplied to the decoder 13. When the value read out from the image memory 12 is "1" which indicates the black transition point, the decoder 13 increments a count of the paint instruction counter 14 by one. On the other hand, when the value read out from the image memory 12 is "2" which indicates the white transition point, the decoder 13 decrements the count of the paint instruction counter 14 by one. The decoder 13 does not increment or decrement the count of the paint instruction counter 14 when the value read out from the image memory 12 is "0" or "3".

The paint instruction counter 14 indicates whether the filling with black, that is, the painting, is valid or invalid. In addition to controlling the paint instruction counter 14 in the above described manner, the decoder 13 in a state where the value read out from the image memory 12 is other than "3" outputs the value "0" (white) when the count in the paint instruction counter 14 is "0" and outputs the value "1" (black) when the count in the paint instruction counter 14 is "1" or greater. When the value read out from the image memory 12 is "3", the decoder 13 outputs the value "1" (black) regardless of the counter of the paint instruction counter 14.

The operation of the decoder 13 is controlled by the CPU 17 in synchronism with the read out operation which reads the values from the image memory 12. At the same time, the synchronizing signal generator 16 is controlled by the CPU 17 and generates a synchronizing signal. The image output of the decoder 13 and the synchronizing signal output from the synchronizing signal generator 16 are supplied to an output device such as a display and a laser printer in synchronism with each other. In addition, the image output of the decoder 13 is fed back to the image memory 12 via the bit converter 15. The bit converter 15 converts the output value "1" of the decoder 13 into a value "3" (11) before feeding it back to the image memory 12.

Next, a description will be given of specific processings carried out by the embodiment, by referring to FIGS. 2 through 4. In FIGS. 2 through 4, a solid line indicates a line graphic which requires no painting or a painted graphic. A broken line indicates a group of black transition points where the painting is to start. A one-dot chain line indicates a group of white transition points where the painting is to end. In addition, numbers indicate the values which are written into the image memory 12, and the value "1" corresponds to the black transition point, the value "2" corresponds to the white transition point and the value "3" corresponds to the black pixel which requires no painting.

Figure 2B:
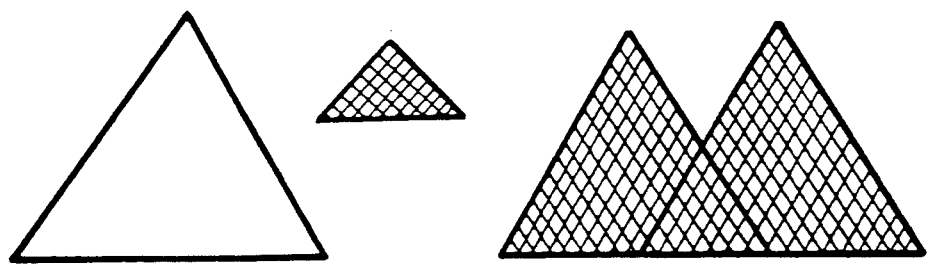

FIG. 2A shows the contents of the image memory 12, where A denotes a line graphic B denotes a painted graphic, and C and D denote graphics to be painted. On the other hand, FIG. 2B shows the output image with respect to the contents of the image memory 12 shown in FIG. 2A.

In a scanning line L1 shown in FIG. 2A, the count of the paint instruction counter 14 is "0" up to a point a4, "1" at a point a5, "0" at a point a6, "1" at a point a7 and "0" at a point a8. For this reason, the value "1" (black) is output from the decoder 13 during an interval from the point a5 to the point a6 and an interval from the point a7 to the point a8. An interval from a point p1 to a point p2 will hereinafter be referred to as an interval p1-p2. On the other hand, the value of the pixel is "3" at the points a1 and a2 and the interval a3-a4. Hence, the value "1" is output from the decoder 13 at the points a1 and a2 and the interval a3-a4 regardless of the count of the paint instruction counter 14.

In a scanning line L2 shown in FIG. 2A, a white transition point (paint end point) of the graphic C and a black transition point (paint start point) of the graphic D overlap at a point b4. In this case, the value of the point b4 is set to "0" or "3". As a result, the count of the paint instruction counter 14 is "0" up to a point b2, "1" at points b3 and b4, and "0" at a point b5. For this reason, the value "1" (black) is output from the decoder 13 during an interval b3-b5. In addition, the value "1" is output at the points b1 and b2 regardless of the count of the paint instruction counter 14.

In a scanning line L3 shown in FIG. 2A, the count of the paint instruction counter 14 is "0" up to a point c2, "1" at a point c3, "2" at a point c4, "1" at a point c5 and "0" at a point c6. Hence, the value "1" (black) is output from the decoder 13 during an interval c3-c6. In addition, the value "1" is output from the decoder 13 at the points c1 and c2 regardless of the count of the paint instruction counter 14.

Figure 3A:
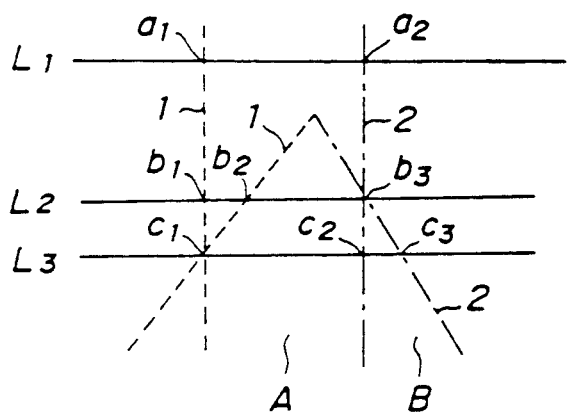
FIGS. 3A through 3C are diagrams for explaining another processing carried out on the system shown in FIG. 1.
Figure 3B:
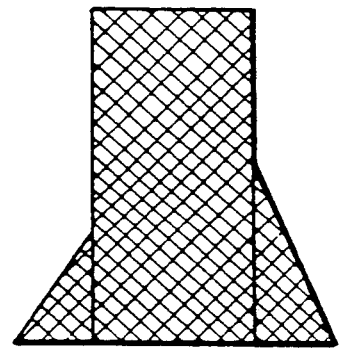

FIG. 3A shows the contents of the image memory 12, where A and B denote graphics to be painted. On the other hand, FIG. 3B shows the output image with respect to the contents of the image memory 12 shown in FIG. 3A.

In a scanning line L1 shown in FIG. 3A, the count of the paint instruction counter 14 is "1" at a point a1 and "0" at a point a2. Hence, the value "1" (black) is output from the decoder 13 during an interval a1-a2.

In a scanning line L2 shown in FIG. 3A, white transition points (paint end points) of the graphics A and B overlap at a point b3. In this case, the value "2" is written in the image memory 12 also for a point which is one pixel on the left of the point b3. As a result, the count of the paint instruction counter 14 becomes "1" at a point b1, "2" at a point b2, "1" at the point one pixel (dot) to the left of the point b3 and "0" at the point b3, and the desired object is achieved.

In a scanning line L3 shown in FIG. 3A, black transition points (paint start points) of the graphics A and B overlap at a point c1. In this case, the value "1" is written in the image memory 12 also for a point one pixel to the right of the point c1. Accordingly, the count of the paint instruction counter 14 becomes "1" at the point c1, "2" at the point one pixel to the right of the point c1, "1" at a point c2 and "0" at a point c3, and the desired object is achieved.

Figure 3C:
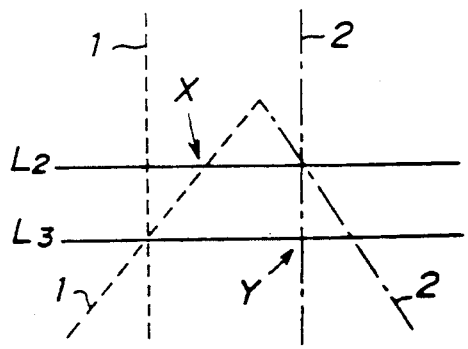

When the white transition points overlap as in the case of the point b3 on the scanning line L2 shown in FIG. 3A, the value "1" which forms a pair with the value "2" may be searched in a direction opposite to the scanning direction on the scanning line L2 and change the value "1" at the closest position to the value "0". In addition, when the black transition points overlap as in the case of the point c3 on the scanning line L3 shown in FIG. 3A, the value "2" which forms a pair with the value "1" may be searched in the scanning direction on the scanning line L3 and change the value "2" at the closest position to the value "0". The desired object can also be achieved by taking such measures. FIG. 3C is a diagram for explaining the above described operation, where X denotes the point where the value is changed from "1" to "0" on the scanning line L2 and Y denotes the point where the value is changed from "2" to "0" on the scanning line L3.

Figure 4B:
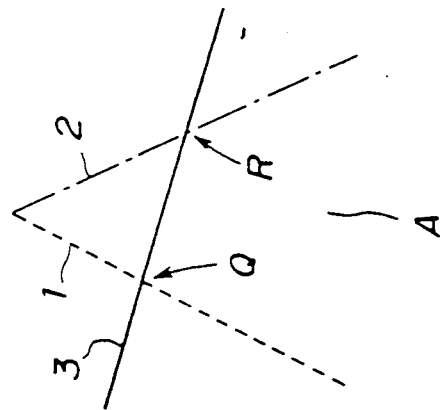
FIGS. 4A and 4B are diagrams for explaining still another processing carried out on the system shown in FIG. 1.
Figure 4A:
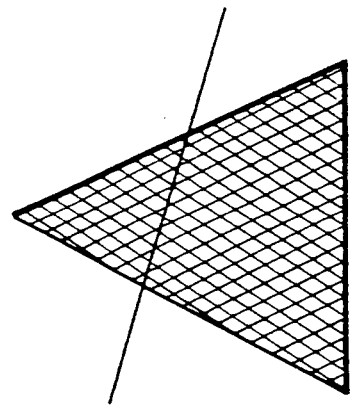

FIG. 4A shows the contents of the image memory 12, where A denotes a graphic to be painted. On the other hand, FIG. 4B shows the output image with respect to the contents of the image memory 12 shown in FIG. 4A.

In FIG. 4A, a line which does not require painting overlaps the graphic A. In this case, at a point Q where the values "1" and "3" overlap, the value "1" is set in the image memory 12 for this point Q because the value "1" (black) should be output from the decoder 13 in this case for both the values "1" and "3". In addition, at a point R where the values "2" and "3" overlap, a shift of the white transition point occurs. Hence in this case, the value "2" is set for a next pixel in order to make the pixel next to the point R a white transition point, and the value "0" or "3" is set in the image memory 12 for this point R. As a result, the desired object is achieved.

Further, the present invention is not limited to these embodiments, but various variations and modifications may be made without departing from the scope of the present invention.

What is claimed is:

1. An image output system, comprising:
   (a) memory means for storing multi-level information which described each pixel of a binary image when the binary image is scanned in a main scanning direction, said multi-level information having:
      (1) a first value at a black transition point where a pixel changes from white to black; and
      (2) a second value at a white transition point where a pixel changes from black to white;
   (b) counter means for keeping a count;
   (c) decoder means coupled to said memory means and said counter means for decoding the multi-level information read out from said memory means, said decoder means outputting a value indicating black when the count of said counter means is greater than or equal to one; and
   (d) control means coupled to said memory means and said decoder means for controlling an operation timing of said decoder means in synchronism with reading of the multi-level information from said memory means;

wherein:
      (i) said control means scans said memory means to read the multi-level information from said memory means, and supplies the read multi-level information to said decoder means;
      (ii) said decoder means increments the count of said counter means by one when the multi-level information has the first value, and decrements the count of said counter means by one when the multi-level information has the second value; and
      (iii) said decoder means keeps the count of said counter means unchanged when the multi-level information has a third value which is other than the first and second values, and outputs the value indicating black regardless of the value of the count of said counter means.

2. The image output system as claimed in claim 1 wherein said multi-level information has the third value when a pixel requires no painting in black.

3. The image output system as claimed in claim 1 wherein said multi-level information has the third value when a pixel is already painted in black.

4. The image output system as claimed in claim 3 which further comprises bit converter means coupled to said decoder means and said memory means for converting the value indicating black output from said decoder means for an arbitrary pixel into the third value and for rewriting a corresponding multi-level information in said memory means for the arbitrary pixel by the third value.

5. The image output system as claimed in claim 1 which further comprises a contour memory which stores contour data related to contours of the binary image, said control means scanning the contour data stored in said contour memory and storing into said image memory the multi-level information which describes each pixel of the binary image when the binary image is scanned in the main scanning direction within said contour memory.

6. The image output system as claimed in claim 1 which further comprises synchronizing signal generator means coupled to said control means for generating a synchronizing signal, said control means controlling operation timings of said decoder means and said synchronizing signal generator means in synchronism with each other.

* * * * *